(12) United States Patent
Collins et al.

(10) Patent No.: US 9,258,606 B1
(45) Date of Patent: Feb. 9, 2016

(54) USING SECOND SCREEN DEVICES TO AUGMENT MEDIA ENGAGEMENT METRICS

(71) Applicant: Google Inc., Mountain View, CA (US)

(72) Inventors: Alexander Collins, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/448,124

(22) Filed: Jul. 31, 2014

(51) Int. Cl.
*H04H 60/33* (2008.01)
*H04N 21/442* (2011.01)
*H04N 21/24* (2011.01)
*H04N 21/658* (2011.01)

(52) U.S. Cl.
CPC ......... *H04N 21/44218* (2013.01); *H04N 21/24* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 6,457,010 B1* | 9/2002 | Eldering et al. | |
| 2004/0088726 A1* | 5/2004 | Ma et al. | 725/46 |
| 2008/0040431 A1 | 2/2008 | Bleeker et al. | |
| 2010/0095317 A1* | 4/2010 | Toebes et al. | 725/9 |
| 2010/0211439 A1* | 8/2010 | Marci | G06Q 30/0201 705/7.29 |
| 2010/0222102 A1* | 9/2010 | Rodriguez | 455/557 |
| 2010/0274673 A1 | 10/2010 | Isaac | |
| 2012/0124604 A1* | 5/2012 | Small | H04N 21/4223 725/12 |
| 2012/0151055 A1* | 6/2012 | Kansal et al. | 709/225 |
| 2013/0144709 A1* | 6/2013 | Narasimhan | G06Q 30/02 705/14.41 |
| 2013/0179441 A1* | 7/2013 | Kuusik | 707/732 |
| 2013/0346154 A1 | 12/2013 | Holz et al. | |
| 2014/0059576 A1* | 2/2014 | Mule | G06T 11/80 725/10 |
| 2014/0108309 A1* | 4/2014 | Frank et al. | 706/12 |
| 2014/0143803 A1* | 5/2014 | Narsimhan et al. | 725/34 |
| 2015/0033266 A1* | 1/2015 | Klappert et al. | 725/52 |

OTHER PUBLICATIONS

International Search Report and Written Opinion in International Application No. PCT/US2015/012575, mailed Apr. 24, 2015, 9 pages.

* cited by examiner

*Primary Examiner* — John Schnurr
*Assistant Examiner* — Cynthia Fogg
(74) *Attorney, Agent, or Firm* — Fish & Richardson P.C.

(57) ABSTRACT

Methods, systems, and apparatus, including computer programs encoded on a computer storage medium, for using second screen devices to augment media engagement metrics. In one aspect, a method includes accessing user activity data describing user activities performed by a user on a first user device during a first time period, and accessing data describing presentation of one or more content items during the first time period on second user devices. For the first user device, determining based on the user activity data, for each of a plurality of second time periods that are sub-periods of the first time period, a first level of user engagement with the first user device, and determining, based on the user activity data, for each second time period that is a sub-period of the first time period, a second level of user engagement with the one or more content items presented.

18 Claims, 5 Drawing Sheets

USING SECOND SCREEN DEVICES TO AUGMENT MEDIA ENGAGEMENT METRICS

BACKGROUND

People spend a significant amount of time consuming media, particularly video media such as video media provided over television broadcasts. Gathering data on how many people engage with a particular presentation of video content is very important, particularly when estimating reach, frequency and other impression metrics. Higher accuracy in the data allows for more accurate pricing of advertisement slots, more accurate ratings numbers, and higher confidence among partners that a particular value is, in fact, being realized.

But just because a television program is broadcast and displayed on a television in a home does not mean the members of the household are actually engaged with the program. For example, many people are often engaged with a mobile device, such as a smart phone or a tablet, during the presentation of television video content. For example, if a user has lost interest in the video content being presented, the user may engage with a mobile device, perhaps to play a game or text a friend. However, engagement with a mobile device does not necessarily mean the user is not engaged with the video content presented on the television; for example, a user may be engaged with a "second screen experience" that is simulcast over the mobile device with a corresponding television program that is broadcast and displayed on another device, such as a television.

SUMMARY

This specification describes technologies relating to the use of second screen devices to augment media engagement metrics.

In general, one innovative aspect of the subject matter described in this specification can be embodied in methods that include the actions of accessing, for a collection of first user devices, user activity data describing user activities performed by a user on the first user device during a first time period, and accessing data describing presentation of one or more content items during the first time period on second user devices, each second user device being different from each first user device. For each first user device determining, based on the user activity data, for each of a plurality of second time periods that are sub-periods of the first time period, a first level of user engagement with the first user device during the first time period, and determining, based on the user activity data, for each of the plurality of second time periods that are sub-periods of the first time period, a second level of user engagement with the one or more content items presented during the first time period. Other embodiments of this aspect include corresponding systems, apparatus, and computer programs, configured to perform the actions of the methods, encoded on computer storage devices.

Various implementations can include some, all, or none of the following features. Determining, for each of the plurality of second time periods, the first level of user engagement with the first user device during the first time period can include, for each second time period, determining an active application on the first user device, and determining user inputs to the active application. Determining, for each of the plurality of second time periods, the second level of user engagement with the one or more content items presented during the first time period can include, for each second time period, determining a particular content item being presented, and determining, based on the particular content item being presented, the active application, and the user inputs to the active application, the second level of user engagement for the second time period. Determining, for each of the plurality of second time periods, the second level of user engagement with the one or more content items presented during the first time period can include, for each second time period, determining the second level of user engagement based on a user model that models user engagement for a plurality of active applications and a plurality of content items. The activity data can describe binary levels of activity, and determining, for each of the plurality of second time periods, the first level of user engagement with the first user device during the first time period can include, for each second time period, determining the binary value of the activity data. Accessing data describing presentation of one or more content items during the first time period on a second user device that is different from the first user device can include accessing log data for the second user device that is associated with the first user device by a user account. The operations can also include determining, from the user activity data, a set of active applications, the set including at least two active applications, and wherein determining, for each of the plurality of second time periods, the first level of user engagement with the first user device comprises determining the first level of user engagement for each active application in the set, and determining, for each of the plurality of second time periods, the second level of user engagement with the one or more content items presented during the first time period comprises determining the second level of user engagement for each active application in the set. Accessing, for the plurality of first user devices, user activity data describing user activities performed by a user on the first user device during the first time period can include receiving, from a reporting application on each first user device, the user activity data.

In general, another aspect of the subject matter described in this specification can be embodied in methods that include the actions of generating data describing user activities performed by the user on the first user device during a first time period, the user activity data describing user inputs to a first active application on the first user device, determining, from data describing the user activities, binary levels of activity for the user, wherein a first binary level indicates that the user is engaged with the first active application and a second binary level indicates the user is not engaged with the first active application, and providing, to a system external to the first user device and as user activity data, the binary levels of activity for each of a plurality of second time periods that are sub-periods of the first time period, and data describing the active application to which the activity data corresponds. Other embodiments of this aspect include corresponding systems, apparatus, and computer programs, configured to perform the actions of the methods, encoded on computer storage devices.

Various implementations can include some, all, or none of the following features. operations can also include, for at least some of the second time periods, determining one or more content items during the first time period that are presented on a second user device, and determining, based on the binary levels of activity, for each of the plurality of second time periods that are sub-periods of the first time period, a second level of user engagement with the one or more content items presented during the first time period. The operations can also include receiving, from the system external to the first user device, schedule data describing the first time period and the one or more content items presented during the first time period, and wherein determining one or more content items during the first time period that are presented on a second user device can include determining, during the second time periods, whether the one or more content items presented during the first time period, and determining the second level of user engagement can include determining a level of user engagement that represents the use is not engaged during each second time period that the one or content items are not being presented. Generating data describing user activities performed by the user on the first user device during a first time period can include receiving information provided by one or more sensors of the first user device.

Particular embodiments of the subject matter described in this specification can be implemented so as to realize one or more of the following advantages. First, measurements of user activity during the presentation of content can provide accurate estimates of user engagement. Second, varying levels of user engagement during presentation of content can be estimated, the knowledge of which helps broadcasters and advertisers when developing programming and campaign strategies. Details of the user activities can be abstracted to protect the user's anonymity and/or privacy, and the abstraction can be done client side to provide even greater protections for privacy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This document describes systems and techniques for using a second screen device to augment media engagement metrics. In general, as users watch television programs or other media content on a primary or "first screen" device (e.g., the living room television, or a computer), they may also be engaged in activities on a secondary or "second screen" device (e.g., a smartphone, tablet, computer). In general, the user's engagement with the content being presented on the first screen device may affect the user's engagement with the second screen device. For example, a user who is actively watching an exciting sporting event on TV may temporarily ignore his or her smartphone. However, when there is a break in the action (e.g., a commercial comes on), the user's attention may shift to his or her phone. These changes in user behavior can be used as an indicator of the user's engagement, or lack thereof, with the media content being presented on the first screen device.

The nature of the user's engagement with the second screen device can also be used as an indicator of the user's engagement with the media content being presented on the first screen device. For example, an increase in user activity on a second screen device with an application associated with the media content, such as a tablet application that allows users to play along with a live game show at home, can indicate increased user engagement with the content being shown on the primary screen. In another example, increased user interaction with a website corresponding to the media content being shown, or increased search activity corresponding to the media content being shown, can suggest that the user is actively engaged with the content being shown. In yet another example, the user may use the second screen device to call or text a telephone number associated with content being shown (e.g., texting to cast a vote in a televised poll), and such activity may be used as an indication of a level of the user's engagement with the content being shown on the primary device.

The second screen device may include sensors that can be used to detect information that suggests the user's level of engagement with media content being presented on the primary screen. For example, the second screen device may be able to sense its own location and determine that it, and therefore the user, has moved away from the location of the primary screen device during a commercial break. In another example, the second screen device may include accelerometers that can detect movement of the second screen device in response to user engagement, such as a user jumping when a goal is scored during a broadcast sporting event, or setting the device aside to leave the room. In yet another example, the second screen device can include a microphone and may be able to detect relative volume levels in the surrounding environment, such as when a user turns down the volume of a television program during a commercial, or has a conversation with others in the room rather than being engaged with the content of the first screen device.

The second screen device may, in some implementations, have an application installed by the user to monitor the engagement signals described above, and the user may specifically "opt in" to various monitoring features. If the user does not opt in, no engagement data is collected. Conversely, if the user does opt in, then the user may also specify the level of information that is provided to a remote engagement server, e.g., the information may be as detailed or as coarse as the user specifies. For example, very detailed information may describe the applications used by the user, the actions taken by the user, and even audio samples of the program captured by the user device. The remote server may then determine whether the user was engaged with the second screen device, and whether the user was also engaged with content presented on the first screen device.

Conversely, very coarse may be a "binary" level of engagement, as determined by the second screen device, and the particular active application with which the user was (or was not) engaged. The remote engagement server may the access additional information related to the user's viewing habits, e.g., set top box logs, and make determinations of whether the user was (or was not) engaged with content presented on the first screen device.

These features and additional features are described in more detail in the sections that follow.

Example Operating Environment

Figure 1:
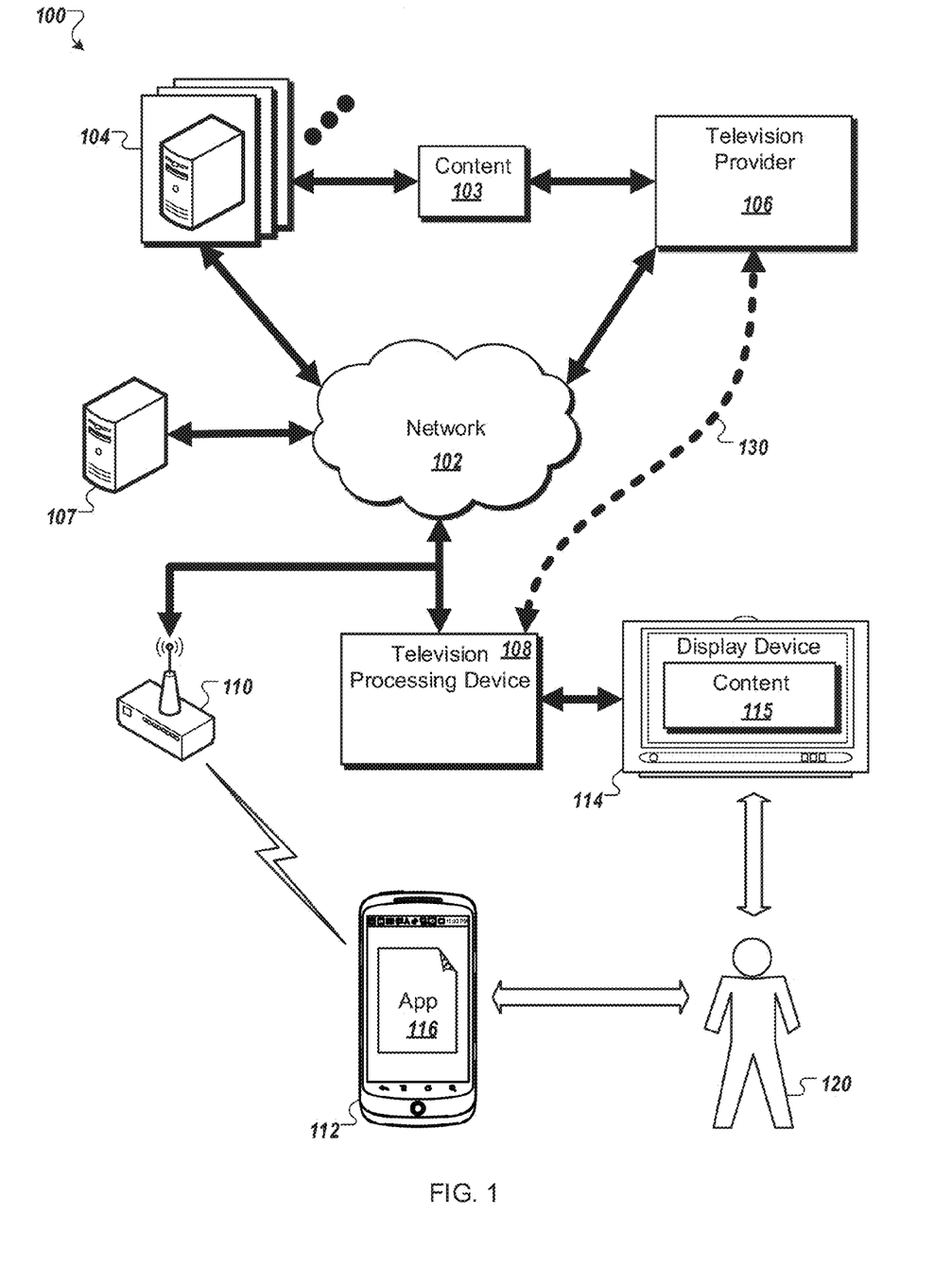
FIG. 1 is a block diagram of an example environment in which second screen devices are used to augment media engagement metrics.

FIG. 1 is a block diagram of an example environment 100 in which second screen devices are used to augment media engagement metrics. A computer network 102, such as a local area network (LAN), wide area network (WAN), the Internet, or a combination thereof, connects online content provider servers 104, a television content provider 106, a user engagement server 107, a television processing device 108, a network access point 110, and a user device 112. The television processing device 108 processes content data provided by the online content provider servers 104 and/or the television content provider 106 through the network 102, and provides the processed content data (e.g., streaming video, on demand video) as content 115 for display on a display device 114 (e.g., a television). In some implementations, the television processing device 108 processes content data 103 provided by the television content provider 106 through a broadcast medium 130 (e.g., cable television providers, satellite television providers), and provides the processed content data as content 115 for display on a display device 114.

The user device 112 is an electronic device capable of requesting and receiving resources over the network 102. Example user devices 112 include personal computers, mobile communication devices, and other devices that can send and receive data over the network 102. The user device 112 typically includes a user application 116, such as a web browser or other applications, to facilitate the sending and receiving of data over the network 102. The user application 116 can enable a user to display and interact with text, images, videos, music and other information provided by remote servers.

As the user 120 watches the content 115 being presented on the display device 114 (e.g., the television, the "first screen" device), he or she may also interact with the user device 112 (e.g., a "second screen" device). In some implementations, user activity on the user device 112 may indicate that the user 120 is engaged with the content 115. For example, the user 120 may interact with a social network or messaging application to discuss the content 115 as it is being presented. In another example, the user 120 may use the user device 112 to call or text a telephone number associated with the content 115 (e.g., to vote for a show contestant, to order an advertised product). In yet another example, the user 120 may interact with a website associated with the content 115 (e.g., a show or advertised product website, a movie database, an online retailer that sells a product being advertised).

Likewise, in some implementations, user activity on the user device 112 may indicate that the user 120 is not engaged with the content 115. For example, the user 120 may interact with an application (e.g., a video game) or website that is substantially unrelated to the content 115. In another example, the user 120 may use the user device 112 to call or text a telephone number not associated with the content 115 (e.g., chatting with a friend rather than paying attention to a show).

In the instance where the user 120 consents to the use of such activity data, the data may be used for measuring the user's 120 engagement with the content 115. With the user's 120 consent to the use of such data, an application 116 is installed on the user device 112. The application then monitors various engagement data and sends data related to the monitoring to the engagement server 107. The user 120 can end the measurement and use of such data at any time by uninstalling the application 116 and/or by revoking consent to the use of such activity data.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content 115 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The application 116 analyzes the user's 120 interactions with the user device 112. In some implementations, the application 116 can identify the applications that the user 120 is using on the user device 120. The application 116 also determines whether an application that is running is active or in the background. For example, an active application is an application for which a viewport is currently instantiated and able to receive inputs, while an application in the background is one that needs first to be selected before the viewports is able to receive inputs. Other ways of distinguishing between active and background applications can also be used.

In some implementations, the application 116 can be configured to analyze user interaction with the user device 112 without identifying the specific applications being used by the user 120. The application 116 may measure the frequency and/or types of physical interactions that the user has with the user device 112, such a touchscreen taps and gestures, accelerometer activity, location changes, changes in ambient sound levels, changes in ambient light levels, or any other appropriate activity that can be measured by sensors or other features of the user device 112. How many of these features and ambient environmental measurements that are monitored can be selected by the user. The user can choose to deselect any of these features and ambient environmental measurements to prevent them from being monitored, and/or the user can choose to opt out of the monitoring entirely after opting in, in which case no such information is collected at all. As described above, the user can also select a level of granularity for the data that is collected. For example, the user 120 may select a "binary" level of granularity in which the user is identified as being either "engaged" or "not engaged". In other examples, the user may choose to use an engagement metric having several levels, such as "high", "moderate", "low", and "not watching". In yet other examples, the user may choose to use a highly granular engagement metric, such as a zero to one-hundred percent value that represents an estimation of user engagement.

For example, an increase in the frequency of user taps on a touchscreen of the user device 112 may indicate that the user 120 is paying relatively more attention to some activity on the user device 120 than to the content 115. In another example, a change in location may indicate that the user 120 is no longer engaged with the content 115 (e.g., the user left the room). In yet another example, changes in ambient volume levels and/or vibration may be indicative of user engagement (e.g., bouncing in a seat and/or cheering during a goal, sitting still during a tense scene), or may be indicative of disengagement (e.g., talking over a commercial or a slow part of a show, setting the device down to leave the room).

The application 116 can provide the measured user activity data to the user engagement server 107 over the network 102. In some implementations, the user engagement server 107 can compare the user activity data to a content schedule that describes the timing of when the content 115 was being shown. For example, the user engagement server 107 can compare a network television broadcast schedule to determine when program content was being shown and when sponsored content (e.g., commercials) were being shown, and compare that information with varying levels and types of user interaction with the user device 112 to determine estimated levels of user engagement with the program content and/or the sponsored content.

In some implementations, the application 116 may include anonymization features that can be configured to filter, remove, or obfuscate information that may be traceable with respect to the identity of the user 120. For example, the application 116 may be configured to remove information such as the user's name, account number, account name, network address, or to remove any other appropriate information from the user activity data before providing the user activity data to any other system such as the user engagement server 107. These features can be provided in addition to other anonymization features implemented in other systems.

If the user device is also providing environment data, such as audio samples, the engagement server 107 can compare the audio samples to a database of video audio samples to determine what video content was being presented on the first screen 115. Similarly, if the engagement server 107 has access to set top box logs for an account associated with the user of the user device, then engagement server 107 can compare the times of the set top box logs to the times of the activity data to determine what video content was being presented on the first screen 115 when activities were (or were not) being performed.

In some implementations, the application 116 can receive schedule data describing periods of time in which the activity of the user 120 is to be measured. For example, the user engagement server 107 can be configured to estimate user engagement levels for a population of users 120 for a predetermined content item that is scheduled for broadcast, and provide schedule information to the application 116 to request that user activity data be collected during the scheduled broadcast time. In such examples, user data may not be collected during non-scheduled periods of time.

In some implementations, the application 116 can receive schedule data describing sub-periods of time in which the activity of the user 120 is to be measured. For example, the user engagement server 107 can be configured to estimate and compare user engagement levels measured during different scenes of a movie, or during program content that is interspersed with sponsored content (e.g., to compare engagement with television commercials and the program in which they are shown).

In some implementations, the application 116 can provide abstracted levels of user engagement information to the user engagement server 107. Rather than identify the application with which the user 120 was interacting, or the sensor readings taken during presentation of the content 115, the application 116 can provide a binary indication (e.g., engaged or not engaged) of the user's 120 engagement with an application on the user device. The binary indications can be sent to the engagement server 107, which then collects data relating to viewing logs to determine if the user was engage or not engaged with the content 115.

In additional variations of this implementation, the application 116 may also be provided data to determine what content 115 is being presented. For example, if the television processing device 108 may be enabled to communicate with the device 112 and may report to the device 112 what is being presented on the television 114. Data describing binary engagement levels, the application with which the user was (or was not engaged), and the corresponding content 115 that was presented may then be sent to the engagement server 107, which then determines whether the user was engaged (or not engaged) with the content 115.

In further variations of this implementation, the application may make the additional determination of whether the user was engaged (or not engaged) with the content 115. The application 116 then reports the determinations, and, optionally, the activity data, to the engagement server 107.

In examples in which the content 103 is provided by the online content provider servers 104, the application 116 may provide the user activity data to the user engagement server 107, and the online content provider servers 104 and/or the television processing device 108 may provide schedule information to the user engagement server 107. For example, the user 120 may select a movie or on-demand video for streaming to the display device 114. The online content provider servers 104 and/or the television processing device 108 may provide information about the selected content 103 to the user engagement server 107. For example, a streaming movie provider may provide information that describes the timing of various scenes in a movie, or an on-demand television provider may provide information that describes the placement of advertisements within the selected show. The user engagement server 107 can compare the provided schedule information to user activity data from the application 116 to estimate user engagement with sub-periods of time within the selected content 103.

Example Analysis of User Activity

Figure 2:
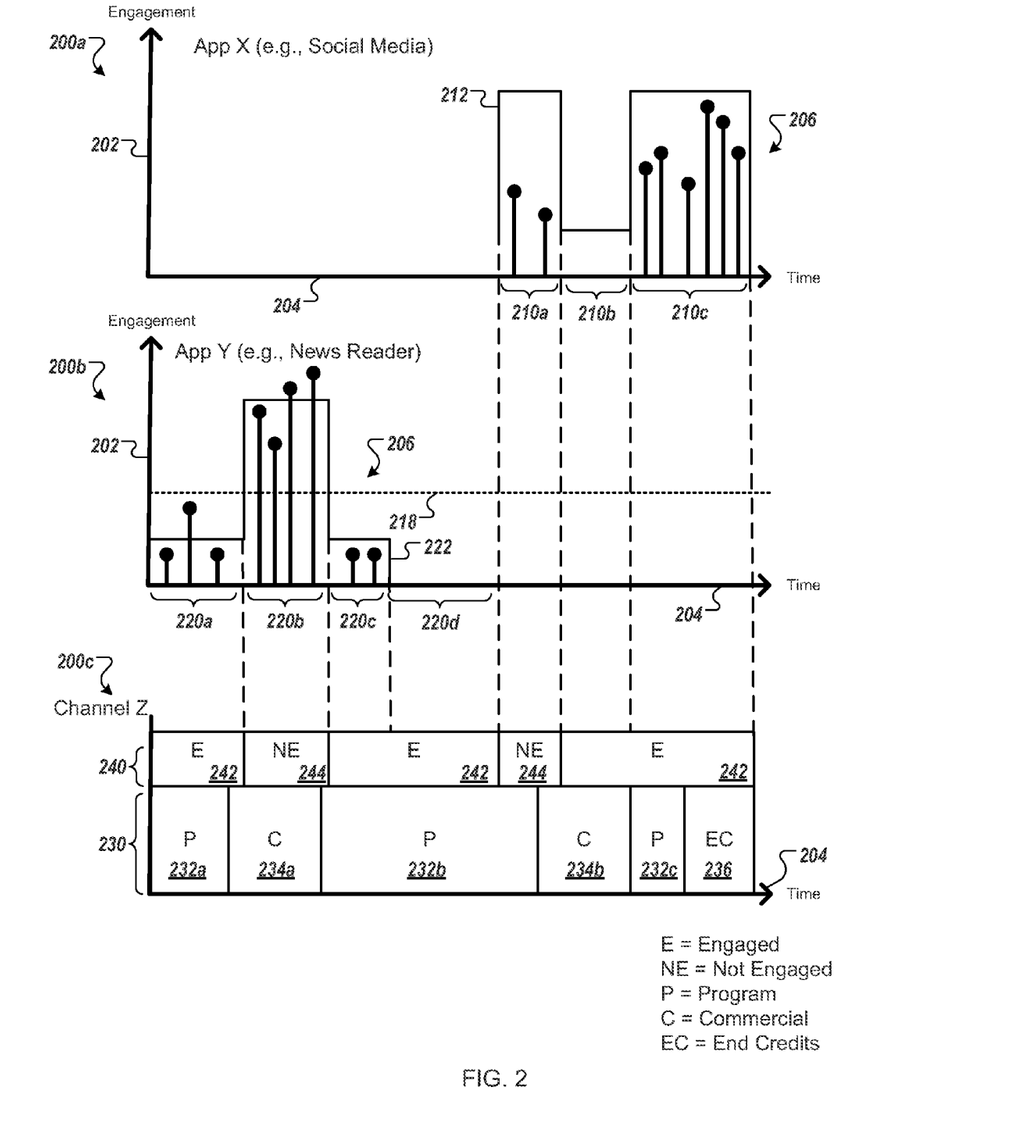
FIG. 2 is a collection of graphs of an example of user activity and engagement data.

FIG. 2 is a collection of graphs 200*a*-200*c* of an example of user activity and engagement data. In some implementations, the user activity and engagement data can be measured by the user device 112 and/or the user engagement server 107 of FIG. 1. As described above, the user 120 chooses whether or not to allow the collection of user activity and engagement data. The user 120 can opt-in to such collection by consenting to the use of such activity data and by installing the application 116 on the user device 112. The user 120 can end the measurement and use of such data at any time by uninstalling the application 116 and/or by revoking consent to the use of such activity data. If the user 120 does not opt in, no information is collected.

The collection includes a graph 200*a*, a graph 200*b*, and a graph 200*c*. The graph 200*a* represents user activity and engagement data for an application "X" (e.g., a social media application) that can be executed by the user device 112. The graph 200*b* represents user activity and engagement data for an application "Y" (e.g., a news reader application) that can be executed by the user device 112. In the examples of the graphs 200*a* and 200*b*, a horizontal axis 204 represents time, and a vertical axis 202 represents level of user activity with the corresponding application. The graph 200*c* represents determinations of engagement and non-engagement with television content 115 (a program and commercials) based on the user activity data, the types of applications used, and the type of content 115.

As described above, engagement with an application may or may not indicate engagement with content on another device. The engagement server 107 can determine the level of engagement with the content 115 based on user models that model user engagement for different combinations of active applications and video content items. The models can be generated in a variety of ways, such as by aggregating this data over many users and many programs and then processed by human raters. In some implementations, the users may be requested to voluntarily provide information to augment user activity data for selected content or time period to generate the models. For example, the user 120 may be asked to identify what he or she was doing on the user device 112 during presentation of the content 115, e.g., being engaged by posting about it to social media, or being disengaged by surfing random websites.

The user model can model emergent crowd source behavior. For example, a user model may reveal that many users tend to "live blog" or text during the end of a particular television program. To illustrate, data may reveal that many users text messages such as "I can't wait for next week's show!" or "This plot twist is so great!" While these activities indicate a high level of user engagement with a texting application, they also indicate a high level of engagement with the content 115 presented on another device.

The model may also show that engagement with a particular application during the program at a particular time may not represent engagement with the content 115. For example, for a one-hour program, the model may indicate that many users may text about the program at the beginning of the program and near the end of the program, thus indicating engagement with the content, but that users texting between the broadcast times of 10 minutes-45 minutes tend to have very low engagement with the content 115.

Likewise, the user model may reveal that some users tend to play games or visit websites unrelated to the content 115. For example, a user reading a news story about politics on a news reader application may be highly engaged with the news reader application, but may not be engaged with the content 115. Again, the models may reflect such relations.

With reference to FIG. 2 in particular, a collection of bars 206 represent levels of user activity. The height of each of the bars 206 represents volume or frequency of user activity, e.g., short bars represent low levels of user activity, and tall bars represent high levels of user activity. For example, for 200a, a short bar may correspond to a user dismissing a text message; a large bar may represent a user typing and sending a text message.

In the context of the illustrated example, user activity associated with the application "X" is determined to indicate user engagement with the application X and with content being presented to the user. A line 212 represents user engagement in a binary (e.g., two-state) form, with line 212 indicating a state of engagement with the application X during the time periods 210a and 210c, and a state of non-engagement with the application X during the time period 210b. For example, during a time period 210a, the user activity indicates that the user 120 was engaged with the application X. However, during this time period, which corresponds to a time period for the television content in 200c, the user model may indicate the user is "not engaged" with the content 115. During a time period 210b user activity is low, indicating that the user 120 was not engaged the application X. Thus, the determination is that the user was engaged with the content 115. Finally, during the time period 210c, the user is again texting, and is thus engaged with the application X. However, the model now indicates the user is also engaged with the content 115.

With respect to application Y, the activity data indicates the user was initially not engaged with the news reader application during time period 220a. For example, the user may have received some alerts, and dismissed them promptly, as indicated by the first and third bars, or dismissed an alert after a short period of time while handling the user device, as indicated by the middle bar 220. The determination of whether the user was handling the user device can be made, for example, by accelerometer readings. The user is thus determined to not be engaged with the news reader application Y, and engaged with the content (as indicated by a model) during the time period 220a.

During the time period 220b, however, the user is determined to be engaged with the news reader application Y. For example, the user may have searched for news stories and navigated in the application. The user is thus determined to be engaged with the news reader application Y, and not engaged with the content (as indicated by the model) during the time period 220b. Finally, during the time period 220c, the user is again not engaged with the news reader application Y, and is the determined to be engaged with the content 115.

During the time period 220d, no user activity is sensed at the user device, and no application is active. Thus, the user 120 is determined to be engaged with the content 115, and not with the user device 112.

In some implementations, a threshold 218 represents a minimum amount of user activity that can be used to determine if the user 120 is engaged or not engaged with the application. For example, during a time period 220a and a time period 220c, user activity is below the threshold 218, indicating that even though the user 120 was interacting with application "Y", the frequency and/or volume was low enough to consider the user 120 as being engaged with the content 115 during those time periods. During a time period 220b user activity exceeds the threshold 218, indicating that the user 120 was not engaged with the content 115. A line 222 represents user engagement in a binary (e.g., two-state) form, with line 222 indicating a state of non-engagement during the time periods 220a and 220c, and a state of engagement during the time period 220b. Thresholding need not be used, however, and the determinations can be made individually for each user activity, or based on combinations of user activities.

In some implementations, the application 116 may provide the user 120 with controls that let the user 120 select the types of user activity data, the granularity of the user activity data, and/or the level of anonymization to apply to the user activity data before the user activity data is provided to the engagement server 107. For example, the user may specify the level of information that is provided to a remote engagement server, e.g., the information may be as detailed or as coarse as the user specifies. In another example, the user may specify that prior to providing the user activity data to any other system (e.g., the user engagement server 107), the application 116 is to filter or remove selected types of information, such as the user's name, account number, account name, or to remove any other appropriate type of information that may be traceable with respect to an anonymous user.

The graph 200c summarizes engagement and disengagement determinations of a content presentation schedule 230 based on the program type of the content, the applications, and the engagement levels.

The content presentation schedule 230 includes a collection of sub-periods 232a-232c which represent periods of time in which programming content (e.g., television shows) are presented as the content 115 during the content presentation schedule 230. The content presentation schedule 230 also includes a collection of sub-periods 234a and 234b which represent periods of time in which sponsored content (e.g., commercials) are presented as the content 115 during the content presentation schedule 230. A sub-period 236 represents a period of time in which end credits for the programming content is presented as the content 115 during the content presentation schedule 230. Although shown as sub-periods of programming and commercials, the sub-periods can also be dividing other ways, such as by n-second sub-periods, for example.

By comparing the content presentation schedule 230 and the engagement data for the user device, the user engagement server 107 can determine what portions of the content 115 the user 120 was engaged with.

In some implementations, data from multiple user devices for a particular set of content are aggregated to determine aggregate levels of user engagement with the content 115. For example, user activity data for an audience of 1000 users during a selected time period may be analyzed to determine that 75% of the audience was engaged with the program content, but only 45% of the audience remained engaged during the commercials. In another example, the user engagement server 107 may determine that a commercial shown during the sub-period 234a kept 30% of the audience engaged, while a commercial shown during the sub-period 234b kept 60% of the audience engaged.

In yet another example, the user engagement server 107 may determine that a particular application for a particular social media service was used by 90% of users that were engaged when using social media An advertiser, for example, may use this information when determining when and where to advertise on social media.

Other data can also be used to determine engagement. For example, environment data, such as movement and sound, can be monitored. To illustrate, the absence of content audio being sensed by the user device may indicate a lack of viewer engagement, even if the user device is not being used, e.g., the user may have muted the television. Likewise, accelerometer readings may indicate rapid movement over a threshold amount of time, indicating the user may have left a room in which the television is located, indicating a lack of viewer engagement.

Combinations of this signal may be used to indicate a lack of viewer engagement or engagement. For example, rapid movement over a threshold amount of time coupled with a decreasing sound level may indicate the user walked away from the television device, which, in turn, indicates a lack of viewer engagement with the content 115. Conversely, rapid movement over a threshold amount of time coupled with an increasing sound level may indicate the user walked to an area near the television device, which, in turn, indicates viewer engagement with the content 115.

Example Processes

Figure 3:
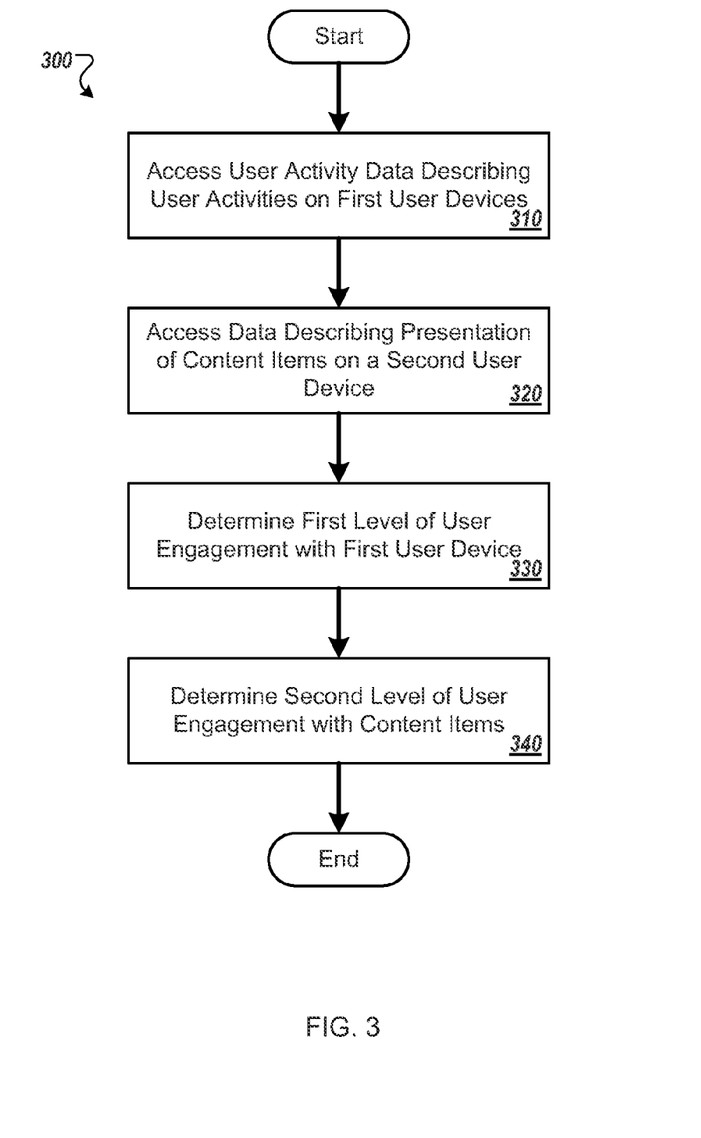
FIGS. 3 and 4 are flow charts of an example processes for using a second screen device to augment media engagement metrics.

FIG. 3 is a flow chart of an example process 300 for using a second screen device to augment media engagement metrics. In some implementations, the process 300 may be performed by the engagement server 107 of FIG. 1. As described above, the user 120 chooses whether or not to allow the collection of user activity and engagement data. The user 120 can choose to permit the operation of the process 300 by installing the application 116 on the user device 112. The user 120 can end the operation of the process 300 at any time by uninstalling the application 116 and/or by revoking consent to the use of such activity data.

At 310, user activity data for a collection of first user devices is accessed. The user activity data describes user activities performed by a user on the first user device during a first time period. For example, the user s may install the application 116 on their user devices 112. The applications 116 measure user activity data and report the activity data to the user engagement server 107. The activity data can be in binary form, indicating engagement levels for an application, or be more descriptive of the activities, indicating what activities were taken, how long each activity lasted, etc. As described above, the user can select the types of user activity data, the granularity of the user activity data, and/or the level of anonymization to apply to the user activity data before the user activity data is provided to the engagement server 107.

In some implementations, the application 116 may also report sensor data to the user engagement sever 107, such as movement and audio.

At 320, data describing presentation of one or more content items during the first time period on second user devices is accessed. Each second user device is different from each first user device, e.g., the second user devices are televisions or desktop computers, for example.

At 330, for each first user device and for each of a collection of second time periods that are sub-periods of the first time period, a first level of user engagement with the first user device during the first time period is determined. The determination is based on the user activity data.

In some implementations, the determination of 330 can include determining an active application on the first user device, and determining engagement with the application. For example, the graph 200a represents user interaction with the active application "X" and corresponding binary engagement levels.

At 340, for each of the collection of second time periods that are sub-periods of the first time period, a second level of user engagement with the one or more content items presented during the first time period is determined. For example, based on the particular content item being presented, the active application, and the user inputs to the active application, the second level of user engagement for the second time period is determined. By way of another illustration, assume that each sub-period of 20 seconds. During each 20 second period, activity data and the active application for a user device is reported. Then based on the content being presented, the activity data and the active application, the server 107 determines whether the user was engaged with the content. For example, based on a user model, a user using a movie data base application may not be engaged with content if the content is a news program; conversely, a user using a new reader application may be engaged with content if the content is the news program.

In some implementations, accessing data describing presentation of one or more content items during the first time period can be done by accessing log data for the second user device that is associated with the first user device by a user account. For example, the user device 112 and the television processing device 108 may both be associated with a common user account belonging to the user 120, and the account can be used to associate information about the content 115 being viewed by the user 120 (e.g., channel selections, program names) with user activity data describing the engagement of the user 120 with the user device 112.

Figure 4:
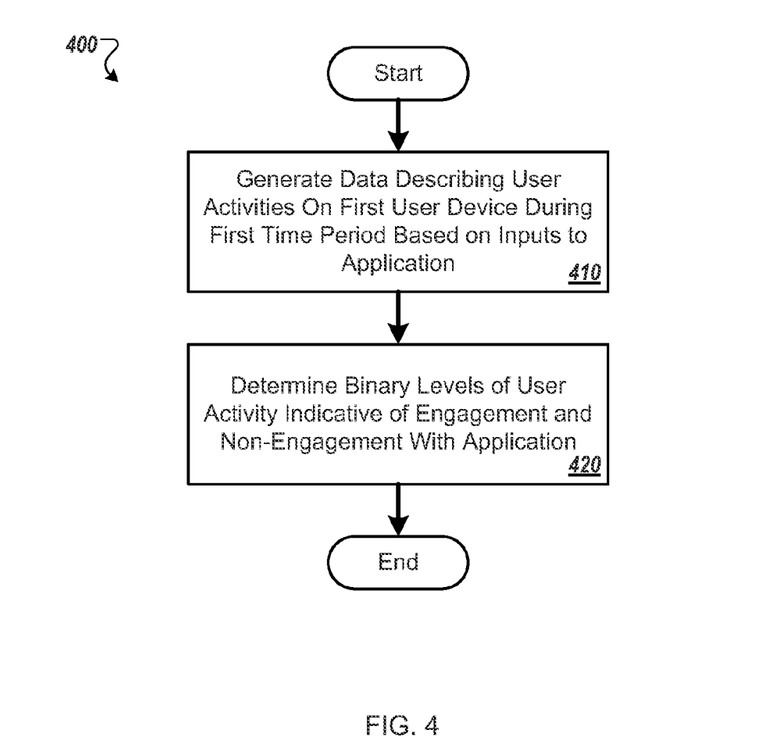

FIG. 4 is a flow chart of an example process 400 for using a second screen device to augment media engagement metrics. In some implementations, the process 400 may be performed by the user device 112 and/or the user engagement server 107 of FIG. 1. As described above, the user 120 chooses whether or not to allow the collection of user activity and engagement data. The user 120 can choose to permit the operation of the process 400 by installing the application 116 on the user device 112. The user 120 can end the operation of the process 400 at any time by uninstalling the application 116 and/or by revoking consent to the use of such activity data.

At 410, data describing user activities performed by the user on the first user device during a first time period is generated. The user activity data includes user inputs to a first active application on the first user device. For example, the graph 200a of FIG. 2 represents user activity data for the user 120 interacting with the application "X" on the user device 112 during the time period of the content presentation schedule 230.

In some implementations, step 410 can also include receiving information provided by one or more sensors of the first user device. For example, the user activity may be measured as touches or gestures sensed by a touchscreen interface, as motion or vibration sensed by an accelerometer and/or compass, as sounds picked up by a microphone, as ambient light levels sensed by a camera or light sensor, location changes sensed by a location sensor (e.g., GPS), or by any other appropriate form of sensor that can measure user activity.

At 420, binary levels of activity for the user are determined. A first binary level indicates that the user is engaged with the first active application and a second binary level indicates the user is not engaged with the first active application. Thresholding can be used to determine if a user is engaged or not engaged, where the thresholding corresponds to predefined activity levels. Examples include typing in more than N characters; selecting a link; inputting a voice command, etc.

Additional Implementation Details

Figure 5:
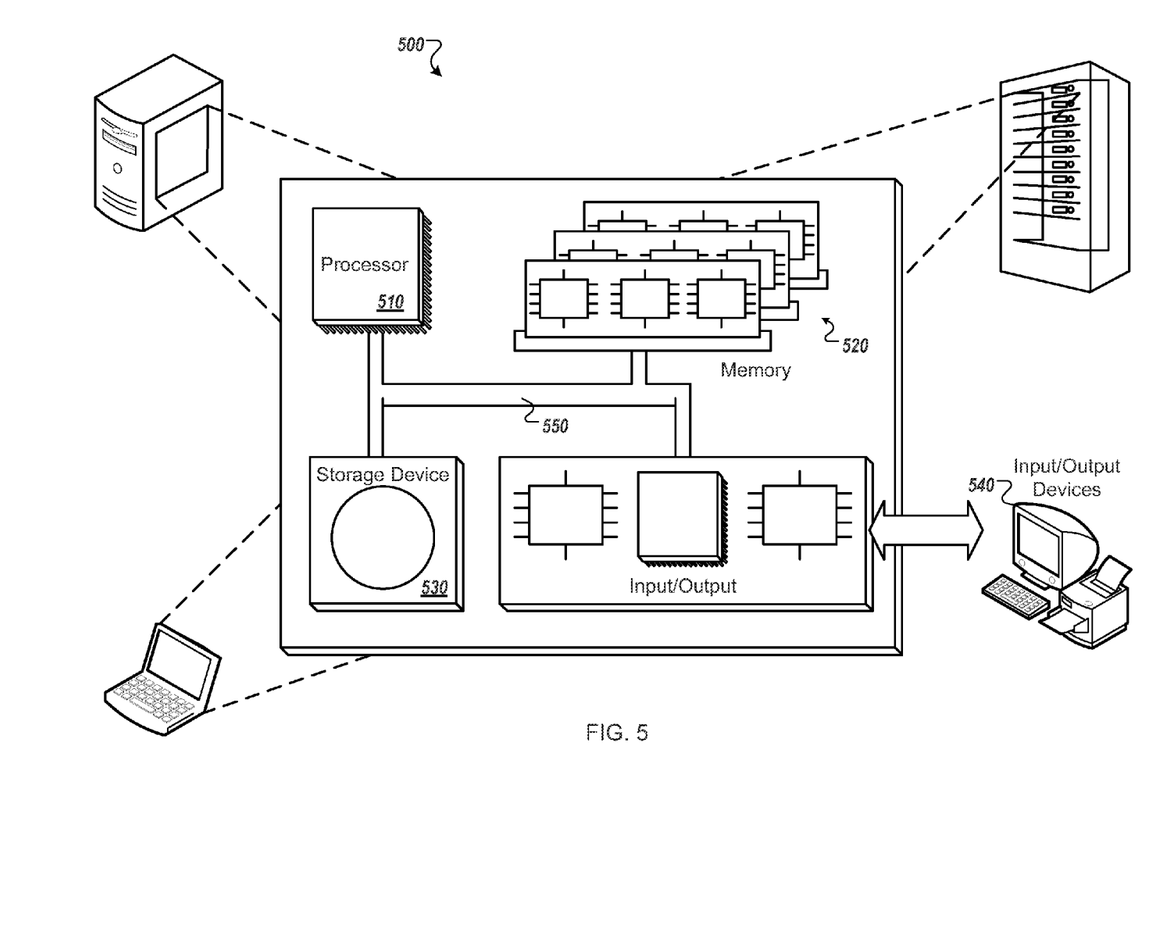
FIG. 5 is a block diagram of an example data processing apparatus.

FIG. 5 is a block diagram of an example data processing apparatus 500. In some implementations, the data processing apparatus 500 can perform some or all of the processes 300, 400, and 500 of FIGS. 3, 4, and 5. In some implementations, the data processing apparatus 500 can be included in the user device 112, the user engagement server 107, the television processing device 108, the display device 114, and/or the online content servers 104 of FIG. 1. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a processing subsystem; and
a memory subsystem storing instructions that causes the processing subsystem to perform operations comprising:
accessing, for a plurality of first user devices, user activity data describing user activities for active applications performed by a user on the first user device during a first time period;
accessing data describing presentation of one or more content items during the first time period on second user devices, each second user device being different from each first user device;
for each first user device determining, based on the user activity data, for each of a plurality of second time periods that are sub-periods of the first time period, respective first levels of user engagement with the first user device for each second time period, wherein first plurality of respective first levels of user engagement indicates engagement with the first user device and at least a second plurality of respective first levels of user engagement indicates disengagement with the first user device; and
determining, based on the user activity data, for each of the plurality of second time periods that are sub-periods of the first time period, respective second levels of user engagement with the one or more content items presented during the first time period, each determination based on a user model that models user engagement for a plurality of active applications and a plurality of content items, and wherein for at least one active application according to the user model:
- a first level of user engagement indicating engagement with the first user device during a second time period is indicative of engagement with a content item presented on the second user device; and
- a first level of user engagement indicating engagement with the first user device during another second time period is indicative of disengagement with the content item presented on the second user device.

2. The system of claim 1, wherein:
determining, for each of the plurality of second time periods, the respective first levels of user engagement with the first user device during the first time period comprises, for each second time period:
- determining an active application on the first user device; and
- determining user inputs to the active application.

3. The system of claim 2, wherein determining, for each of the plurality of second time periods, the respective second level of user engagement with the one or more content items presented during the first time period comprises, for each second time period:
- determining a particular content item being presented; and
- determining, based on the particular content item being presented, the active application, and the user inputs to the active application, the second level of user engagement for the second time period.

4. The system of claim 1, wherein the activity data describes binary levels of activity, and determining, for each of the plurality of second time periods, the respective first levels of user engagement with the first user device during the first time period comprises, for each second time period, determining the binary value of the activity data.

5. The system of claim 4, wherein:
accessing data describing presentation of one or more content items during the first time period on a second user device that is different from the first user device comprises accessing log data for the second user device that is associated with the first user device by a user account.

6. The system of claim 2, the operations further comprising:
determining, from the user activity data, a set of active applications, the set including at least two active applications; and
wherein:
- determining, for each of the plurality of respective second time periods, the first level of user engagement with the first user device comprises determining the first level of user engagement for each active application in the set; and
- determining, for each of the plurality of respective second time periods, the second level of user engagement with the one or more content items presented during the first time period comprises determining the second level of user engagement for each active application in the set.

7. The system of claim 2, wherein accessing, for the plurality of first user devices, user activity data describing user activities performed by a user on the first user device during the first time period comprises receiving, from a reporting application on each first user device, the user activity data.

8. A first user device, comprising:
a processing subsystem; and
a memory subsystem storing instructions that causes the processing subsystem to perform operations comprising:
generating data describing user activities performed by the user on the first user device during a first time period, the user activity data describing user inputs to a first active application on the first user device;
determining, from data describing the user activities for each of a plurality of second time periods that are sub-periods of the first time period, respective first levels of user engagement with the first user device for each second time period, wherein a first plurality of respective first levels of user engagement indicates engagement with the first user device and at least a second plurality of respective first levels of user engagement indicates disengagement with the first user device;
determining, based on the user activity data, for each of the plurality of second time periods that are sub-periods of the first time period, respective second levels of user engagement with the one or more content items presented during the first time period, each determination based on a user model that models user engagement for a plurality of active applications and a plurality of content items, and wherein for at least one active application according to the user model:
- a first level of user engagement indicating engagement with the first user device during a second time period is indicative of engagement with a content item presented on a second user device; and
- a first level of user engagement indicating engagement with the first user device during another second time period is indicative of disengagement with the content item presented on the second user device; and
providing, to a system external to the first user device and as user activity data, the first levels of activity for each of the second time periods, and data describing the active application to which the activity data corresponds.

9. The device of claim 8, wherein the operations further comprise, for at least some of the second time periods:
determining one or more content items during the first time period that are presented on the second user device; and
determining, based on the first levels of activity, for each of the plurality of second time periods that are sub-periods of the first time period, a second level of user engagement with the one or more content items presented during the first time period.

10. The device of claim 8, the operations further comprising:
receiving, from the system external to the first user device, schedule data describing the first time period and the one or more content items presented during the first time period; and
wherein:
- determining one or more content items during the first time period that are presented on the second user device comprises determining, during the second time periods, whether the one or more content items were presented during the first time period; and
- determining the second level of user engagement comprises determining a level of user engagement that represents the user is not engaged during each second time period that the one or more content items are not being presented.

11. The device of claim 8, wherein generating data describing user activities performed by the user on the first user device during a first time period further comprises receiving information provided by one or more sensors of the first user device.

12. A computer-implemented method, comprising:
accessing, by a computer processor and for a plurality of first user devices, user activity data describing user activities for active applications performed by a user on the first user device during a first time period;
accessing, by the computer processor, data describing presentation of one or more content items during the first time period on second user devices, each second user device being different from each first user device;
for each first user device determining, by the computer processor and based on the user activity data, for each of a plurality of second time periods that are sub-periods of the first time period, respective first levels of user engagement with the first user device for each second time period, wherein a first plurality of respective first levels of user engagement indicates engagement with the first user device and at least a second plurality of respective first levels of user engagement indicates disengagement with the first user device; and
determining, by the computer processor and based on the user activity data, for each of the plurality of second time periods that are sub-periods of the first time period, respective second levels of user engagement with the one or more content items presented during the first time period, each determination based on a user model that models user engagement for a plurality of active applications and a plurality of content items, and wherein for at least one active application according to the user model:
a first level of user engagement indicating engagement with the first user device during a second time period is indicative of engagement with a content item presented on the second user device; and
a first level of user engagement indicating engagement with the first user device during another second time period is indicative of disengagement with the content item presented on the second user device.

13. The method of claim 12, wherein:
determining, by the computer processor and for each of the plurality of second time periods, the first level of user engagement with the first user device during the first time period comprises, for each second time period:
determining an active application on the first user device; and
determining user inputs to the active application.

14. The method of claim 13, wherein determining, by the computer processor and for each of the plurality of second time periods, the respective second level of user engagement with the one or more content items presented during the first time period comprises, for each second time period:
determining a particular content item being presented; and
determining, based on the particular content item being presented, the active application, and the user inputs to the active application, the second level of user engagement for the second time period.

15. The method of claim 12, wherein the activity data describes binary levels of activity, and determining, for each of the plurality of second time periods, the respective first levels of user engagement with the first user device during the first time period comprises, for each second time period, determining the binary value of the activity data.

16. The method of claim 15, wherein:
accessing, by the computer processor, data describing presentation of one or more content items during the first time period on the second user device that is different from the first user device comprises accessing log data for the second user device that is associated with the first user device by a user account.

17. The method of claim 12, further comprising:
determining, from the user activity data, a set of active applications, the set including at least two active applications; and
wherein:
determining, for each of the plurality of respective second time periods, the first level of user engagement with the first user device comprises determining the first level of user engagement for each active application in the set; and
determining, for each of the plurality of respective second time periods, the second level of user engagement with the one or more content items presented during the first time period comprises determining the second level of user engagement for each active application in the set.

18. The method of claim 12, wherein accessing, by the computer processor and for the plurality of first user devices, user activity data describing user activities performed by a user on the first user device during the first time period comprises receiving, from a reporting application on each first user device, the user activity data.

* * * * *